(12) United States Patent  (10) Patent No.: US 8,384,851 B2
Nirmal et al.  (45) Date of Patent: Feb. 26, 2013

(54) REFLECTIVE DISPLAY SYSTEM WITH ENHANCED COLOR GAMUT

(75) Inventors: Manoj Nirmal, St. Paul, MN (US); Gregory G. Jager, Oakdale, MN (US); Michael F. Weber, Shoreview, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 407 days.

(21) Appl. No.: 12/685,330

(22) Filed: Jan. 11, 2010

(65) Prior Publication Data

US 2011/0170037 A1   Jul. 14, 2011

(51) Int. Cl.
*G02F 1/1335*   (2006.01)

(52) U.S. Cl. .......................................... 349/68; 349/106

(58) Field of Classification Search ..................... 349/58, 349/106
See application file for complete search history.

(56) References Cited

U.S. PATENT DOCUMENTS

| | | | |
|---|---|---|---|
| 5,751,385 A | 5/1998 | Heinze | |
| 5,882,774 A | 3/1999 | Jonza et al. | |
| 5,889,567 A * | 3/1999 | Swanson et al. | 349/62 |
| 6,243,149 B1 * | 6/2001 | Swanson et al. | 349/62 |
| 6,449,023 B2 * | 9/2002 | Swanson et al. | 349/62 |
| 6,531,230 B1 | 3/2003 | Weber et al. | |
| 6,783,349 B2 | 8/2004 | Neavin et al. | |
| 6,816,290 B2 * | 11/2004 | Mukawa | 359/15 |
| 6,910,777 B2 * | 6/2005 | Ito | 353/31 |
| 6,922,267 B2 | 7/2005 | Endo et al. | |
| 7,358,943 B2 * | 4/2008 | Asao | 345/87 |
| 7,403,180 B1 * | 7/2008 | Silverstein et al. | 345/84 |
| 7,542,113 B2 | 6/2009 | Yoshii et al. | |
| 7,919,153 B2 * | 4/2011 | Tomita et al. | 428/1.1 |
| 2001/0048493 A1 * | 12/2001 | Swanson et al. | 349/62 |
| 2002/0186350 A1 | 12/2002 | Peterson | |
| 2003/0071942 A1 * | 4/2003 | Kojima et al. | 349/106 |
| 2003/0147112 A1 * | 8/2003 | Mukawa | 359/15 |
| 2005/0280785 A1 * | 12/2005 | Beeson et al. | 353/97 |
| 2006/0066557 A1 * | 3/2006 | Floyd | 345/102 |
| 2007/0132675 A1 * | 6/2007 | Asao | 345/80 |
| 2007/0206280 A1 * | 9/2007 | May et al. | 359/443 |
| 2008/0157000 A1 | 7/2008 | Shamir et al. | |
| 2008/0180784 A1 * | 7/2008 | Silverstein et al. | 359/295 |
| 2008/0266333 A1 * | 10/2008 | Silverstein et al. | 345/691 |

FOREIGN PATENT DOCUMENTS

| | | |
|---|---|---|
| WO | WO 2007/132364 | 11/2007 |
| WO | WO 2007/138251 | 12/2007 |

OTHER PUBLICATIONS

Coates, "Low-Power Large-Area Cholesteric Displays", SID Mar. 2009, [Retrieved from the Internet: http://www.magink.com/prks/news_94.pdf]pp. 16-19.

* cited by examiner

*Primary Examiner* — K. Cyrus Kianni

(57) ABSTRACT

A display system includes a reflective display panel and a light source tailored to enhance the color gamut of the system. The panel, which may be a Cholesteric liquid crystal display panel, includes an array of reflective pixels, each pixel comprising a first, second, and third subpixel of different first, second, and third colors. The light source illuminates a front of the display panel with source light to enable observers to view images formed by the panel. The light source includes a lamp and an enhancing element. The lamp, which may be a metal halide lamp, emits lamp light that includes the first, second, and third colors. The enhancing element may be an optical filter, a supplemental LED light source or other light source, or both. The enhancing element enhances the system color gamut, for example, by increasing the color gamut area relative to illumination with the lamp alone.

3 Claims, 10 Drawing Sheets

REFLECTIVE DISPLAY SYSTEM WITH ENHANCED COLOR GAMUT

FIELD OF THE INVENTION

This invention relates generally to display systems, with particular application to reflective display systems in which the display is illuminated from the front. The invention also relates to associated articles, systems, and methods.

BACKGROUND

Display systems of various types are known. Many such systems utilize a display panel that must be backlit with a large area backlight in order for the user to perceive the image generated by the display panel. Such systems are popular in display screens for laptop computers, mobile communication devices, and similar electronic devices. The backlight, which may include one or more diffusing film, reflecting film, prismatic film, light guide, and light source, for example, emits white light over an output area that is substantially the same size as the display panel. The display panel, e.g., a liquid crystal (LC) display panel, has a matrix of individually addressable elements (referred to as picture elements or "pixels") that can be controlled via an electronic control unit to transmit red, green, and/or blue light from each pixel. In many cases, the area of a given pixel in plan view is subdivided into three smaller independently addressable areas—one to regulate red light, one to regulate green light, and one to regulate blue light—and these are referred to as subpixels. In some display technologies, however, the subpixels are coextensive with the associated pixel, i.e., they do not have a smaller area than the associated pixel.

Display systems that operate based on reflected light, rather than transmitted light, are less common than transmissive-type displays. This may be due in part to complications relating to the choice of the external light source, its placement relative to the display panel and the viewer, and challenges in providing adequate brightness. In some cases, ambient daylight may be relied upon as the source of external light. In other cases, an electrically powered light source may be used, and mounted in a specific location designed to provide optimum viewing.

Metal halide lamps have become increasingly popular in commercial, residential, and industrial lighting applications. For example, metal halide lamps are used to illuminate sports stadiums and other athletic facilities. One reason for the popularity of these lamps is their relatively efficient operation relative to incandescent, fluorescent, and mercury vapor lamps, and their ability to provide white light of suitable color temperature and color rendering index (CRI) for many applications.

BRIEF SUMMARY

We have found that the performance of reflective display systems can be disappointing in some respects depending on the combination of components selected for the various system functions. For example, depending on the type of external light source selected and the type of reflective display panel selected, a given reflective display system may exhibit a range of possible output colors (referred to generally as the "color gamut" of the system, discussed further below) which is limited relative to other types of display systems. We have found this to be the case, for example, even when using a white light emitting metal halide lamp as the external light source.

We have developed several techniques for improving the color gamut of such reflective display systems. In some cases, we selectively filter the nominally white light source. In some cases, we add a supplemental light source to the original light source to boost the output at selected wavelengths. In some cases, we do both, i.e., we add a supplemental light source and selectively filter the light source.

The present application therefore discloses, inter alia, a display system that includes a reflective display panel and a light source tailored to enhance the color gamut of the system. The panel, which may be a Cholesteric liquid crystal display panel, may include an array of reflective pixels, each pixel comprising, for example, a first, second, and third subpixel of different first, second, and third colors. The light source illuminates a front of the display panel with source light to enable observers to view images formed by the panel. The light source includes a lamp and an enhancing element. The lamp, which may be a metal halide lamp or other suitable gas discharge or vapor lamp, emits lamp light that includes the first, second, and third colors. The enhancing element may be an optical filter, a supplemental LED light source or other light source, or both. The enhancing element enhances the system color gamut, for example, by increasing the color gamut area and/or the brightness relative to illumination with the lamp alone.

We also disclose display systems that include a display panel and a light source configured to illuminate the display panel with source light. The display panel may have a front and back surface, and may also include electronically addressable reflective pixels, each pixel comprising a plurality of different colored subpixels, e.g., a first, second, and third subpixel of different first, second, and third colors, respectively. The light source is configured to illuminate the front surface of the display panel with the source light, such that the source light is selectively reflected by the pixels to provide a color image to an observer disposed in front of the display panel. The light source may include a first lamp that emits a first lamp light, the first lamp light including light components of the first, second, and third colors. For example, if the first second, and third colors comprise red, green, and blue, respectively, the lamp light may include substantial emission in the red, green, and blue regions of the spectrum, such that the lamp light is nominally white. A combination of the first lamp light and the display panel may provide a first color gamut, and a combination of the source light and the display panel may provide a second color gamut. Significantly, the light source includes a first enhancing element such that the second color gamut has an area greater than that of the first color gamut.

In some cases, the first lamp may be or include a metal halide lamp. In some cases, the display panel may be or include a reflective liquid crystal (LC) display panel, e.g., in particular a Cholesteric liquid crystal display (ChLCD) panel, or an electrophoretic type display.

The second color gamut may have an area on the 1931 CIE chromaticity diagram that is at least 10%, or 20%, or 30% greater than that of the first color gamut.

The first enhancing element may be or include a first filter disposed to filter the first lamp light. The light source may include a filter assembly that at least partially surrounds the first lamp, and the first filter may be disposed on the filter assembly. The first filter may be or include a multilayer optical interference filter and/or an absorptive filter. The first filter may selectively block light from 560 to 600 nm, for example.

The light source may also include a second enhancing element, e.g., one or more light-emitting diode (LED). In some cases the one or more LED may emit visible light whose peak wavelength is greater than 600 nm. Alternatively, such supplemental LED may be used as the first enhancing element in embodiments that omit the first filter.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIG. 12b is a schematic side or sectional view of an alternative light source to that of FIG. 12a;

In the figures, like reference numerals designate like elements.

DETAILED DESCRIPTION OF ILLUSTRATIVE EMBODIMENTS

In the following detailed description we describe, among other things, display illumination systems that improve the optical performance of a reflective display. The appearance—e.g. the brightness, contrast, and color gamut—of a reflective display may be determined by the product of the illumination spectrum of the light source, and the reflectance spectrum of the display medium. Desirably, the illuminant spectrum is matched to the display reflection spectrum for optimal performance. Some of the light emitted by metal halide lamps, and potentially by other types of lamps and light sources, undesirably occurs at wavelengths that fall between, or overlap, the response curves of different colored subpixels of the display system. This can produce an inferior color gamut for the system. We propose one or more filters that selectively remove such undesirable spectral components, in order to significantly improve the color gamut. In addition, the light source desirably has a sufficient intensity at the primary colors (e.g., red, green, and blue) of the display medium to maximize the accessible color gamut of the display. This may be achievable with a single illuminant, but is more feasible with a hybrid illumination system that combines the strengths of two or more illumination technologies. This may improve the optical performance and maximize the cost efficiency (cost/lumen) of the overall system.

Figure 1:
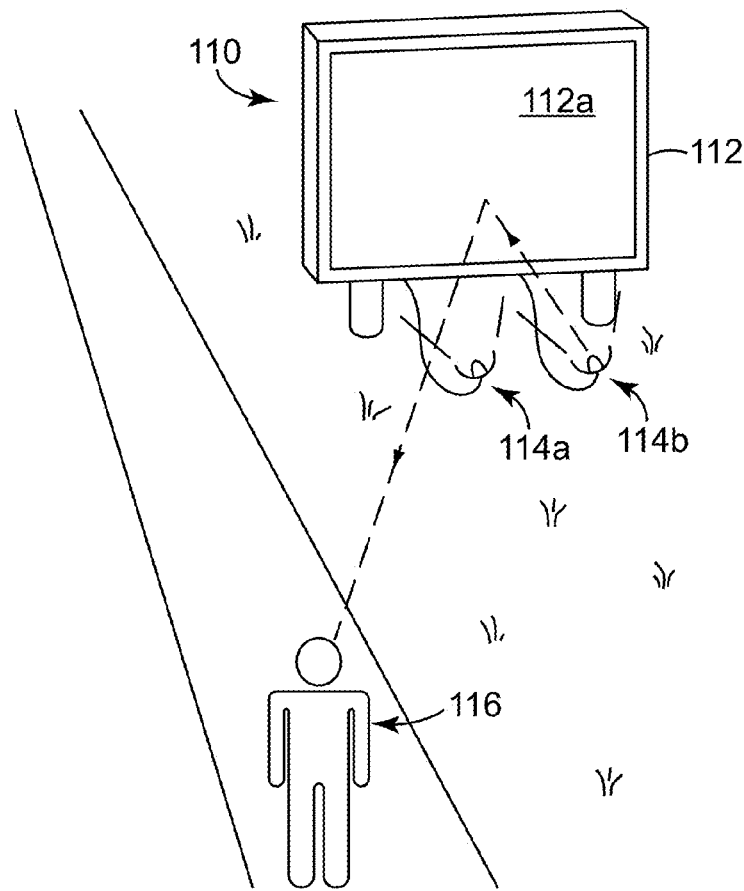
FIG. 1 is a perspective view of a reflective display system.

In FIG. 1, a reflective display system 110 is shown in perspective view. The system is depicted as a relatively large area display made for an outdoor environment. The system may thus use materials and components that are suitable for use in outdoor display applications. Alternatively, the display system may be designed for indoor use, or it may be made in a smaller format suitable for mobile applications in which it may be carried from place to place by a user.

The system 110 includes a reflective display panel 112 and some external light sources 114a, 114b, collectively referred to as a light source 114. The display panel may include or may be coupled to an electronic controller (not shown) that controls the images displayed on the panel 112. This control is accomplished by controlling the reflective state of a multitude of pixels arranged in an orderly array over an extended active area or output surface 112a of the panel 112. Any given pixel can be controlled to reflect light of a particular primary color, such as red, green, or blue, or to reflect none, some, or all of these colors so as to cover a range from substantially black (non-reflective) to substantially white (reflecting over substantially the entire visible spectrum), and many colors in between, including each of the primary colors themselves. When illuminated by a white light source, the appropriate portion(s) of the visible spectrum are reflected by each pixel so that all of the pixels in the array collectively form the desired image in full color. The reflected light which forms the image is perceived by an observer 116 positioned generally in front of the display panel 112.

The output surface 112a of panel 112 may correspond to a front surface of the panel, beneath or behind which lies a back or rear surface of the panel. In contrast to many display systems that rely exclusively on a backlight (disposed behind the back surface of the display panel) to make the image visible to observers, the system 110 need not include such a backlight to make the image visible. Instead, the system may, if desired, rely only on one or more external light sources such as light source 114, which illuminate the front surface, rather than the back surface, of the panel.

Figure 2:
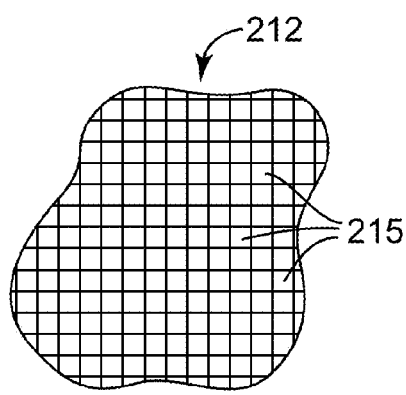
FIG. 2 is a schematic close-up plan view of a portion of a pixelated display panel.

FIG. 2 is a schematic close-up plan view of a portion of a pixelated display panel 212, which may be the same or similar to the reflective panel 112 of FIG. 1. The view of FIG. 2 may be a front view of the panel 212. The panel 212 comprises an ordered array of individually addressable pixels 215, each of which can be controlled to reflect light of a particular primary color, or to reflect none, some, or all such colors as described above so as to cover a range from black to white, and many colors in between. In the embodiment of FIG. 2, the subpixels of each pixel are not separately shown because they are assumed to be substantially co-extensive with their respective pixel. Thus, for example, for each pixel 215, there may be a separate red, green, and blue subpixel, each having the same size as the pixel 215, and arranged in a sandwich construction discussed further below in connection with FIG. 4.

Figure 3:
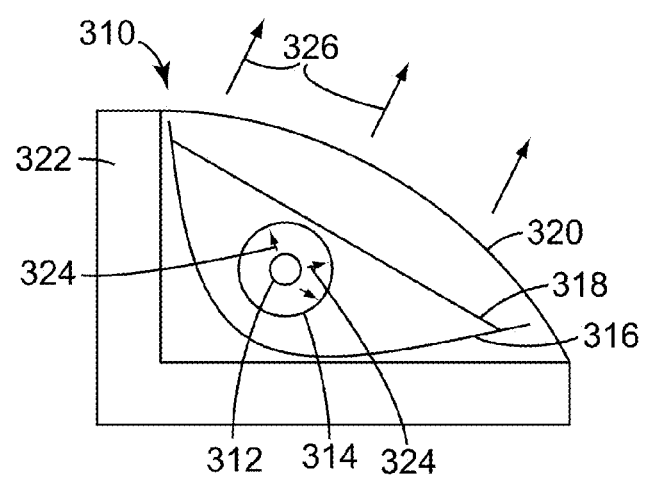
FIG. 3 is a schematic side or sectional view of a light source that may be used in a reflective display system.

The selectively controllable reflectivity of the display panel pixels relies on a source of broadband (e.g. "white") light which can thus be selectively reflected. FIG. 3 is a schematic side or sectional view of an exemplary light source 310 that may be used for this purpose in a reflective display system. The source 310 includes a lamp 312, lamp housing 314, reflector 316, filter plate 318, and lenslet cover 320, all situated on a suitable light source fixture 322. Note that not all of these elements are required, and other suitable light source designs may omit at least some of the elements shown in the embodiment of FIG. 3, and may include other elements not shown in FIG. 3. A discussion of filters, which may be disposed in or on the filter plate, or on the lamp 312, lamp housing 314, reflector 316, and/or lenslet cover 320, or elsewhere in the light source, is provided below.

The lamp 312 is typically electrically powered, and converts the electricity into emitted light referred to herein as lamp output light, or simply lamp light (shown schematically in the figure by arrows 324). The lamp light 324 is preferably broadband, e.g., emitting at wavelengths extending at least over substantially the entire visible spectrum, particularly including the primary colors that are reflected by the subpixel elements. However, the broadband lamp light 324 need not be, and typically is not, uniformly distributed over the visible spectrum. On the contrary, exemplary lamps 312, including but not limited to metal halide lamps, emit light in narrow lines or bands that are scattered irregularly over the visible spectrum as a function of the composition of the lamp. In exemplary display systems discussed herein, characteristics of the irregular lamp light 324 are such that, if the lamp 312 is used by itself to illuminate the reflective display with the lamp light 324, the range of perceived colors that can be obtained is characterized by a first color gamut. However, if an enhancing element is included in the light source, as discussed elsewhere herein, the light source provides a source output light, or simply source light (shown schematically in the figure by arrows 326), whose spectral composition differs substantially from that of lamp light 324. When the reflective display is illuminated with this source light 326, the range of perceived colors that can be obtained is characterized by a second color gamut that is enhanced relative to the first color gamut. For example, the second color gamut may have an area, as plotted on a CIE chromaticity diagram, that is at least 10%, or 20%, or 30% greater than that of the first color gamut. The spectral composition of the source light 326 may differ from that of the lamp light 324 in a subtractive way, by filtering the lamp light at selected wavelengths, or in an additive way, by supplementing the lamp light with light emitted by an LED source or other suitable source, or in both a subtractive way and an additive way.

One reflective display technology of particular interest, but not the only reflective display technology contemplated herein, is referred to as a Cholesteric Liquid Crystal (ChLC) display. ChLC displays generally comprise a nematic liquid crystal and a chiral additive blended together to spontaneously form a helical structure with a well defined pitch. This pitch determines the wavelength of light reflected by and hence the color of the material. The color can be adjusted by varying the ratio of the nematic liquid crystal and chiral components. A pixel in a ChLC display can be switched between its planar reflective (colored) state and its semi-transparent focal conic state, by application of an appropriate drive signal.

Unlike a conventional nematic liquid crystal (NLC) based display, a ChLC display does not require polarizers or color filters, resulting in a simpler device construction at a potentially lower cost. In a full color NLC display, the RGB subpixels are arranged side-by-side. As result, only about a third of the viewing area is occupied by a given set of subpixels of a given primary color. In contrast, each subpixel in a ChLC display reflects a single primary color while transmitting the other primary colors. A full color ChLC display can be constructed by stacking a set of RGB panels, with the individual RGB subpixels overlapped on top of each other and reflecting different regions of the spectrum.

Figure 4:
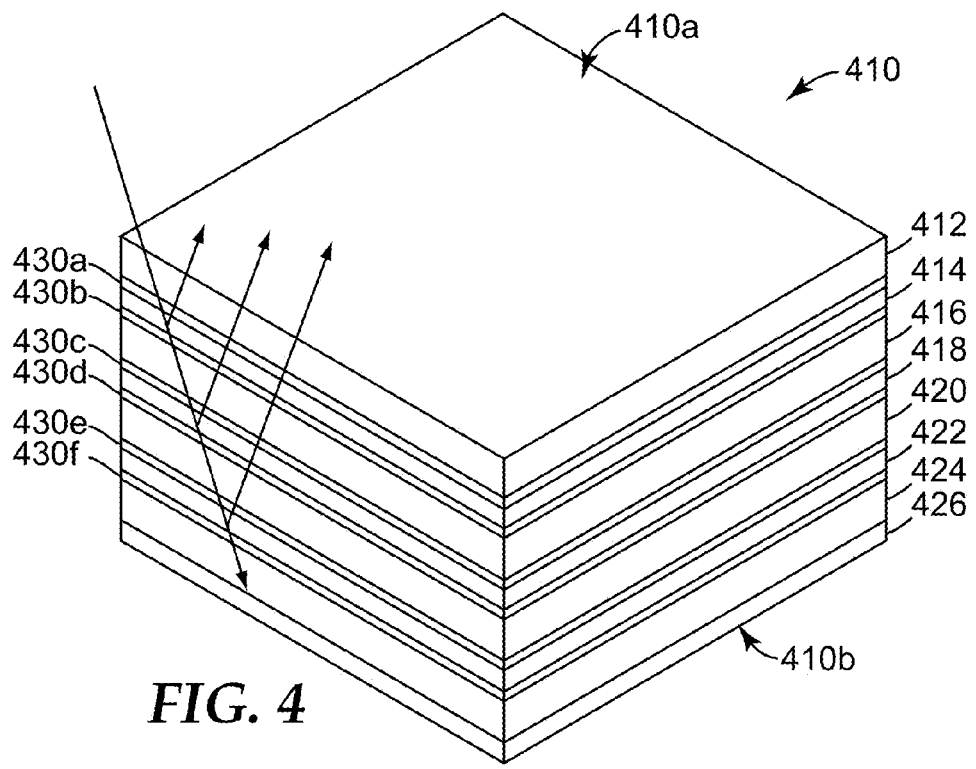
FIG. 4 is a schematic perspective view of one pixel of a reflective display panel.

One embodiment of a full color ChLC pixel 410 is shown in schematic perspective view in FIG. 4. The pixel 410 has a front surface 410a and a back surface 410b. Source light from the external light source impinges upon the front surface 410a. In the figure, the reference numerals have the following meanings 412, 424: clear substrates;
414: blue-reflecting ChLC layer;
416: yellow-transmitting filter layer;
418: green-reflecting ChLC layer;
420: red-transmitting filter layer;
422: red-reflecting ChLC layer;
426: black absorbing layer; and
430a-f: electrode layers used to control the reflectivities of the respective ChLC layers.

Each subpixel may consist essentially of the appropriate ChLC mixture sandwiched between two transparent electrodes, which may comprise indium tin oxide (ITO), for example. Thus, layers 414, 430a, 430b may comprise a blue-reflecting subpixel, layers 418, 430c, 430d may comprise a green-reflecting subpixel, and layers 422, 430e, 430f may comprise a red-reflecting subpixel. The depicted construction may comprise four substrates (layers 412, 416, 420, 424), where the two interior substrates (layers 416, 420) are coated with ITO on both sides, and the two exterior substrates (layers 412, 424) are coated with ITO on just one side. Incident light enters through the front surface 410a, and the individual subpixels reflect the red, green, and blue (R, G, and B) primary colors or spectral regions. Any remaining light is absorbed by the black absorber at the back of the stack. Individual subpixels can be switched continuously between a reflective planar and semi-transparent focal-conic state using the appropriate drive signal, thus enabling a full color display.

Figure 5:
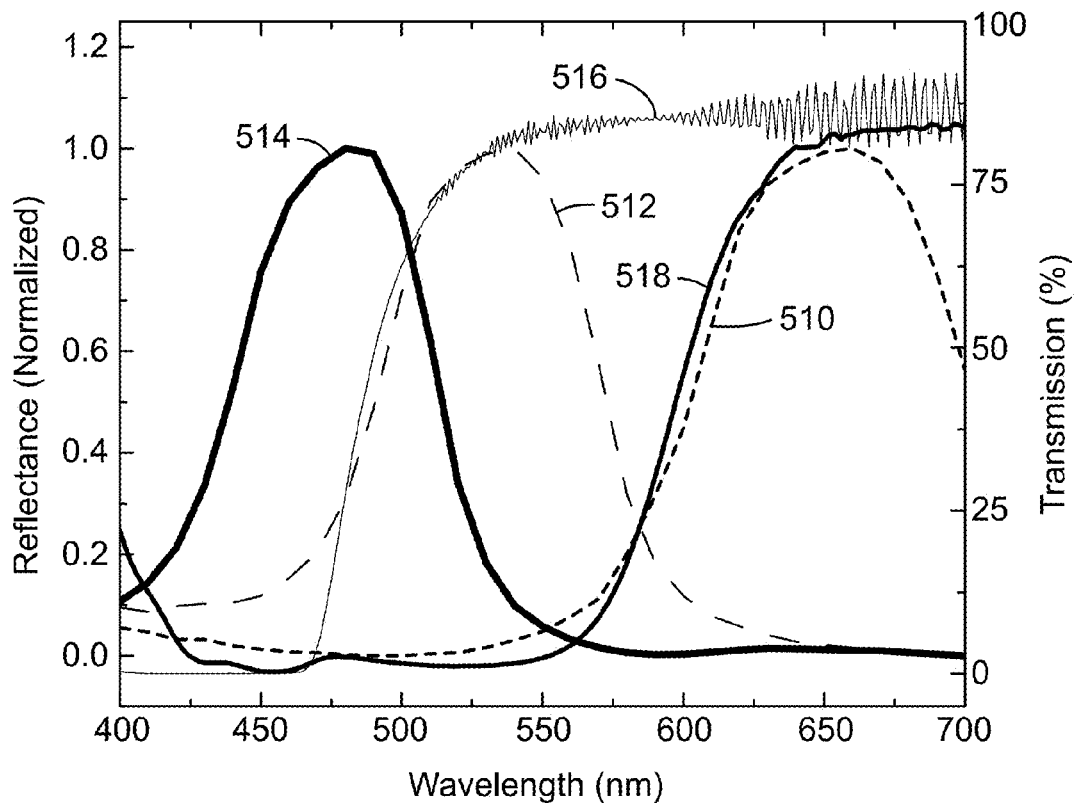
FIG. 5 is a combination graph showing the spectral reflectivity of certain reflective subpixels, and the spectral transmissivity of certain filters used in the construction of a reflective pixel.

One drawback of ChLC-type reflective displays is the relatively broad nature of the reflectance spectra of the individual subpixels, which can result in overlapping spectral response and poor color saturation. The color saturation can be improved to some extent by introducing red and yellow color filters in the construction, as provided in the construction of FIG. 1 by layers 420 and 416, respectively. These filters serve to trim or block the short wavelength edges of the red- and green-reflecting ChLC reflection spectra. In this regard, FIG. 5 provides a combination graph that shows the spectral reflectivity of exemplary red-, green-, and blue-reflecting ChLC subpixels as curves 510, 512, 514 respectively. These curves, which are centered at about 660, 540, and 480 nm, are drawn to scale according to the normalized reflectance scale on the left-hand side of the figure. Superimposed on these curves are curves 516 and 518, which represent the measured (single-pass) transmission of exemplary yellow-transmitting and red-transmitting filter layers, respectively, such as layers 416, 418. The curves 516, 518 are drawn to scale according to the percent transmission scale on the right-hand side of the figure. By narrowing the observed reflection spectra, color filters such as 416, 418 can increase the color gamut of a ChLC-based reflective display system significantly.

As an alternative to ChLC technology, other suitable reflective displays may comprise electrophoretic type displays.

As mentioned already above, the appearance of a reflective display can also strongly depend on characteristics of the illumination source. One class of illumination sources of particular interest is the class of so-called "metal halide" lamps. Such lamps produce light by passing an electric current through a gas/vapor mixture. In typical metal halide lamps currently available, a sealed transparent tube made of fused silica or other suitable material includes a noble gas such as argon under high pressure. The tube also includes mercury, and a variety of metal halides (typically iodides or bromides) of metals such as scandium, sodium, thallium, indium, sodium, dysprosium, tin, holmium, thulium, gallium, and/or lead. When the lamp is initially turned on, an electric arc is set up through the noble gas, across two electrodes that extend into the tube. Heat generated by the arc then slowly vaporizes the mercury and the metal halides, which emit light as the pressure and temperature in the tube increase further to steady-state operating levels. The mixture of metals used in the tube control or determine the output spectrum of the lamp light. Typically, the output spectrum comprises a number of sharp lines unevenly distributed over the visible spectrum. The foregoing description is not meant to be limiting, and any developments in metal halide lamps that may occur after the filing of this application are intended to be encompassed by the term "metal halide" lamp or source.

Figure 6:
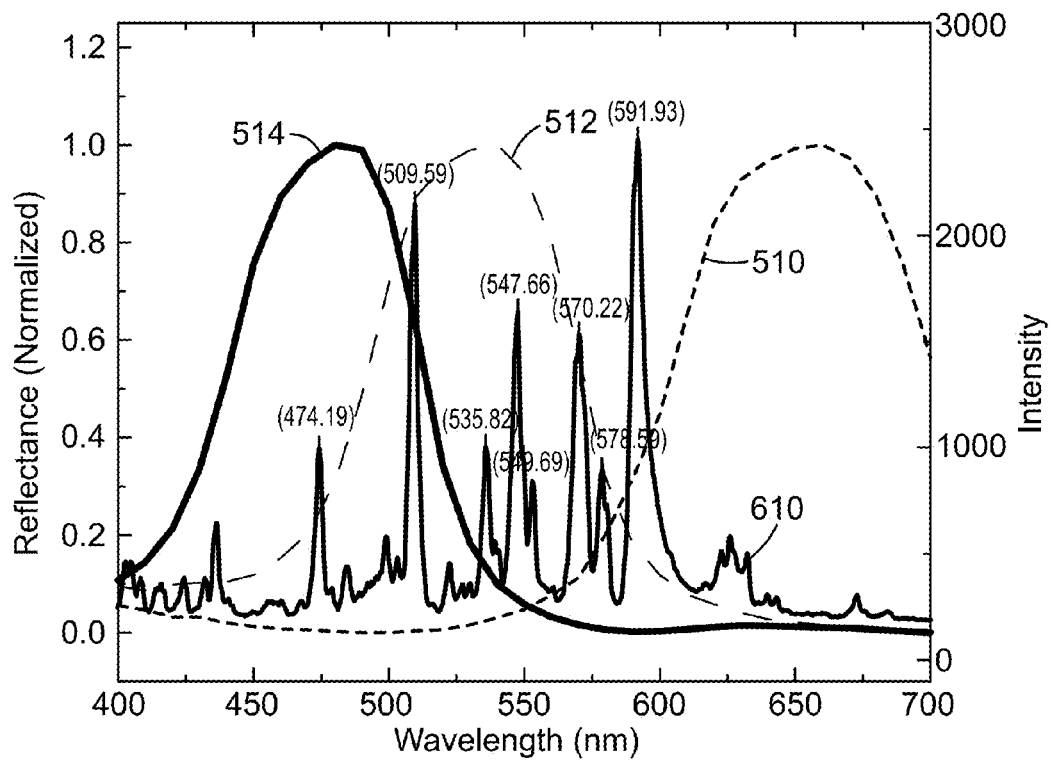
FIG. 6 is a combination graph showing the spectral reflectivities of the subpixels of FIG. 5, and the spectral intensity of a typical metal halide lamp.

FIG. 6 is a combination graph showing the spectral reflectivities of the subpixels of FIG. 5, and the spectral intensity of a typical metal halide lamp. Since the reflectivities of the subpixels are the same as in FIG. 5, the same reference numerals 510, 512, 514 are used for the red-, green-, and blue-reflecting ChLC subpixels. These curves are drawn to scale according to the normalized reflectance scale on the left-hand side of the figure. Superimposed on these curves is a curve 610 which represents the lamp output of an exemplary metal halide lamp. The curve 610 is drawn to scale according to the intensity scale (in arbitrary units) on the right-hand side of the figure. Significant spectral lines are identified by a decimal number representing the peak wavelength in nanometers, which decimal numbers are enclosed in parenthesis to distinguish them from ordinary reference numerals.

An ideal source would have narrow spectral features of sufficient intensity, centered at the R, G, & B primary colors of the subpixels of the display, to provide acceptable system brightness and color gamut. In the case of the metal halide source depicted in FIG. 6, spectral features at about 474 nm and those from about 535 to 550 nm satisfy this criterion. On the other hand, the blue-green line at about 510 nm lies between the display blue and green primary colors (curves 514, 512). This imparts a greenish hue to light reflected by the blue subpixel and a bluish hue to light reflected by the green subpixel, hence degrading color saturation and gamut. An appropriate yellow color filter (see FIGS. 4 and 5) may be used to partially block this spectral line. For example, suitable dyed films may be obtained from CPFilms, a subsidiary of Solutia Inc., for use as yellow-transmitting and red-transmitting color filters. The lamp emission features from about 570 to 592 nm lie between the display green and red primary colors (curves 512, 510). Of particular concern is the feature at about 592 nm. This line is present in most metal halide sources. Due to its spectral location and high intensity, it imparts a yellowish hue to light reflected by the green subpixel and desaturates light reflected by the red subpixel. Metal halide lamps contain a mixture of substances that determine the spectral features present in the lamp emission spectrum. One potential solution would be to eliminate the substances that generate the unwanted spectral features. This, however, would require the design of a custom lamp.

Figure 7:
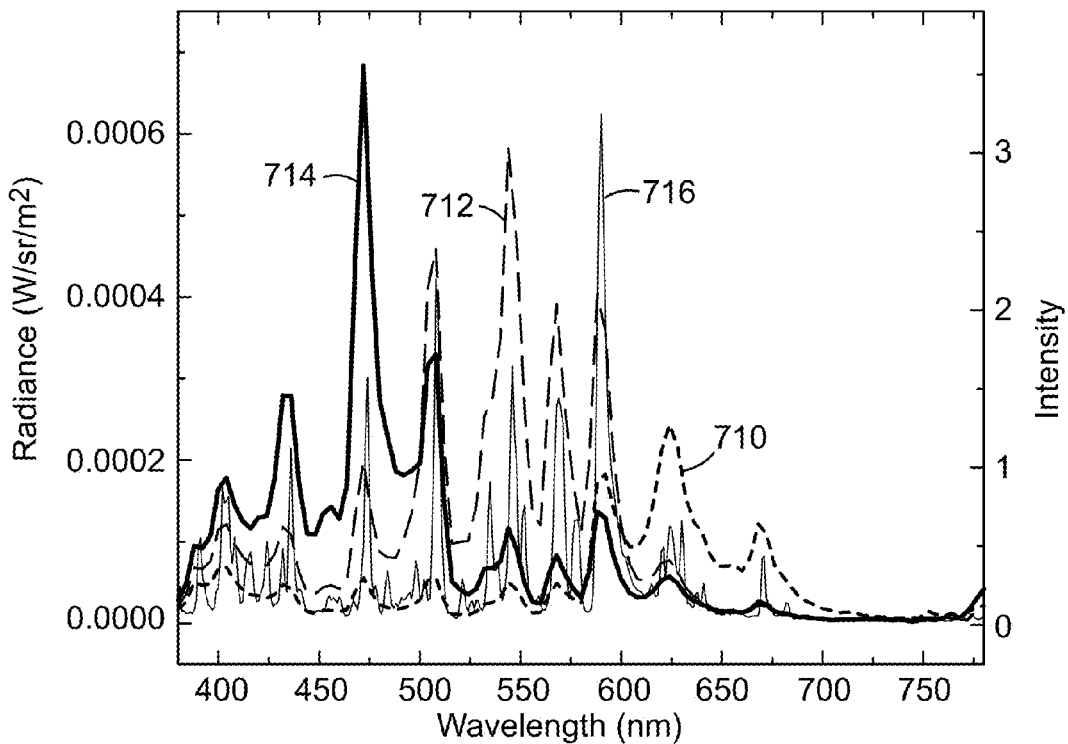
FIG. 7 is a combination graph of the spectral intensity of a typical metal halide lamp, and the reflected intensity or radiance of such lamp when reflected from a red, green, and blue subpixel of a Cholesteric liquid crystal display (ChLCD) panel.

The product of (i.e., the result of multiplying) the lamp output curve 610 with each of the subpixel reflectivity curves 510, 512, 514 yields spectral information that represents the intensity or radiance of light that is reflected by each ChLC subpixel when using a metal halide lamp as the source of illumination. Alternatively, a reflective display system can be set up, and light at various points in the system can be analyzed with a spectrophotometer or other suitable device. This was done using a metal halide lamp as the light source, and a particular ChLC panel, referred to hereinafter as "the RGB ChLC panel", as the reflective display panel. The RBG ChLC panel had a construction similar to that of FIG. 4, with red, green, and blue subpixels, and with a red-transmitting filter (layer 420), but no yellow-transmitting filter (layer 416) was included in the construction. This panel was controlled with suitable electrical signals applied to the various electrodes so as to activate only the red subpixels, or only the green subpixels, or only the blue subpixels as needed during testing. Light that was reflected from the panel could then be analyzed under each of these conditions. This was done, and the resulting curves, labeled 710, 712, 714 for light reflected by the red-, green-, and blue-reflecting state of the RBG ChLC panel, respectively, are shown in FIG. 7. The curves 710, 712, 714 are drawn to scale according to the radiance scale on the left-hand side of the figure. Superimposed on these curves is the measured spectral output 716 of the metal halide lamp used in the setup. The output 716 is drawn to scale according to the intensity scale (in arbitrary units) on the right-hand side of the figure.

The sharp features seen in FIG. 7 in the curves 710, 712, 714 are similar to those present in the metal halide lamp light, which is included for reference (curve 716). While each of the primary color subpixels, when activated, highlights those spectral features of the lamp centered around its respective reflection peak, features from all across the illumination spectrum are present in each subpixel curve to some extent. This is due to the broad reflection spectra of the ChLC subpixels, and the long tails that extend far out on both sides of the reflection peaks as shown in FIGS. 5 and 6. Broadband front surface and interfacial reflections in the stack (Fresnel reflections) also contribute to this.

Figure 8:
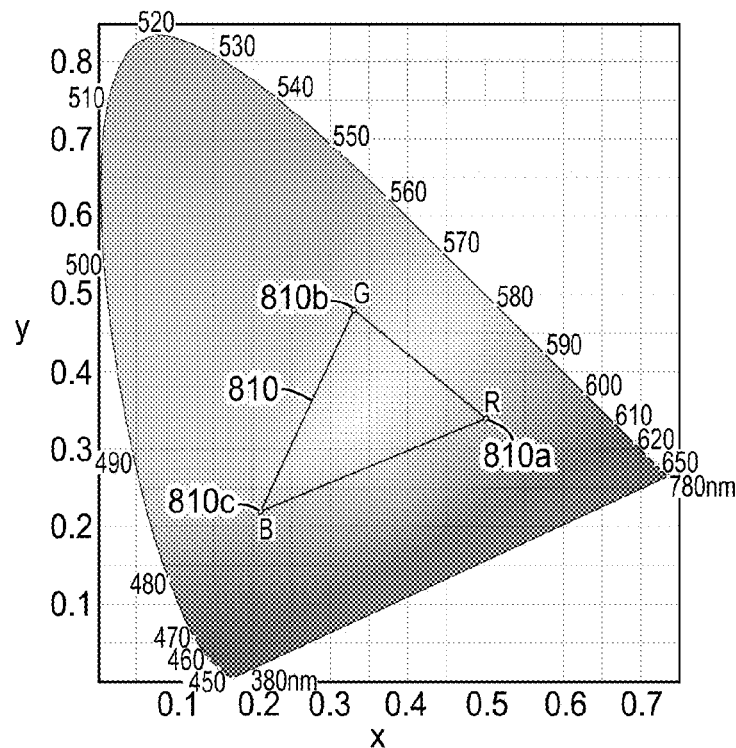
FIG. 8 is a CIE chromaticity diagram showing the color gamut of a reflective display system that incorporates the metal halide lamp and the Cholesteric liquid crystal display (ChLCD) subpixels of FIG. 7.

The net effect is to desaturate the primary colors reflected by the subpixels, and to limit the color gamut of the display system. The color gamut of the described display system, which again uses a metal halide lamp having a lamp output as shown in FIG. 7 as the illumination source, and the RGB ChLC panel as the reflective display panel, is shown in FIG. 8. This figure makes use of the well-known 1931 CIE chromaticity diagram, promulgated by the Commission Internationale de l'Eclairage (International Commission on Lighting) or "CIE". Those skilled in the art will be familiar with the CIE chromaticity diagram, and will recognize it as a convenient tool or standard used to characterize and quantify perceived colors. The color (or "chromaticity" or "chromaticity coordinates") of a light source or article can be precisely measured or specified by a point or region expressed in terms of one or more chromaticity coordinates (x,y) on the CIE chromaticity diagram, using the CIE 1931 standard colorimetric system. Such a chromaticity diagram is shown in FIG. 8. For a color display, the set of all possible colors the display can generate is represented by a region, zone, or area on the chromaticity diagram referred to as the "color gamut" of the display. For a tri-color based display (i.e., a display that uses exactly three distinct subpixel colors, e.g., red, green, and blue), the color gamut is triangle-shaped, with each corner of the triangle corresponding to the perceived display color when only one of the subpixel colors is "on". The color gamuts of different displays can be compared by comparing their respective areas on the chromaticity diagram.

Thus, in FIG. 8, the triangle 810 represents the color gamut of the above-described reflective display system. The triangle 810 has endpoints 810a, 810b, 810c, representing the color of the system with only the red-reflecting subpixels, with only the green-reflecting subpixels, and with only the blue-reflecting subpixels (respectively) turned "on" or activated.

Another shortcoming with current metal halide sources is the lack of sufficient intensity in the red region of the spectrum, as seen in FIG. 7, for example. In spite of these issues, metal halide sources offer significant advantages over alternative sources such as LEDs and tungsten halogen sources. The metal halide sources typically provide superior power efficiency (display brightness per watt consumed by the light source), lower weight (light source weight/display brightness), and cost (lumens per dollar, for example). As a result, metal halide sources have become popular in many regions for large area illumination applications such as outdoor vinyl billboards.

As mentioned above, we propose two independent, but combinable, techniques for overcoming the deficiencies of metal halide sources when used as light sources in reflective display systems. In a subtractive technique, we propose filtering the lamp light provided by the metal halide source in one or more selective spectral region. In an additive technique, we propose supplementing the lamp light with one or more additional light sources, such as LED sources of a particular color.

We first address the filtering technique.

Unwanted spectral line(s) of the lamp light may be removed using a filter that selectively blocks such line(s), and placing the filter at an appropriate point in the light path from the lamp to the reflective display so as to intercept the unwanted light. Such a filter may be or include an interference filter of appropriate design. For example, the interference filter may comprise a substrate on which is coated a stack of alternating layers of high- and low-refractive index inorganic materials, such as $TiO_2$ and $MgF_2$ or other suitable materials. The total number of layers, and the thickness profile of the layers or the optical repeat units (typically, a pair of adjacent layers), can be tailored to reflect a given wavelength band. Alternatively, the filter may be polymeric in construction, with tens, hundreds, or thousands of optically thin polymer layers that combine to selectively reflect light as desired. Again, the total number of layers and the layer thickness profile can be tailored to selectively reflect light as desired. See, for example, any of the multilayer optical films made by coextrusion, casting, and orientation (stretching) processes described in: U.S. Pat. No. 5,882,774 (Jonza et al.) "Optical Film"; U.S. Pat. No. 6,531,230 (Weber et al.) "Color Shifting Film"; and U.S. Pat. No. 6,783,349 (Neavin et al.) "Apparatus for Making Multilayer Optical Films". Polymeric multilayer optical films that have at least one set of birefringent layers, as well as such films that have only isotropic layers (although less desirable), may be used.

Figure 9:
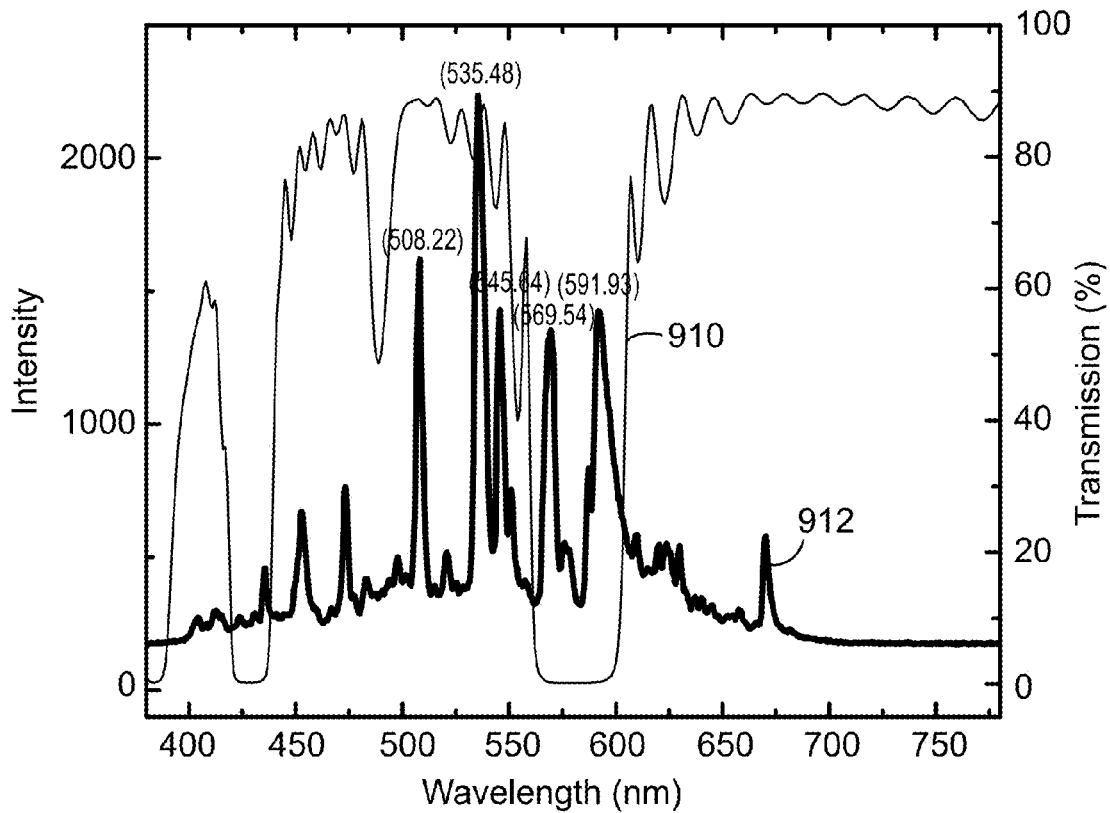
FIG. 9 is a combination graph of the spectral intensity of a typical metal halide lamp, and the spectral transmissivity of an exemplary multilayer optical interference filter useable as a filter for the light source.

The transmission spectrum of such a multilayer optical interference filter of inorganic construction (Omega Optical, type 589RB35) suitable for use as a filter is shown (curve 910) in the combination graph of FIG. 9 along with the spectral intensity of a typical metal halide lamp (type Ushio MHR-100 D, shown by curve 912). Strictly speaking, the curve 910 represents the transmission of the filter for normally incident light. In the figure, significant spectral lines of the lamp are again identified by a decimal number representing the peak wavelength in nanometers, which decimal numbers are again enclosed in parenthesis.

Figure 10A:
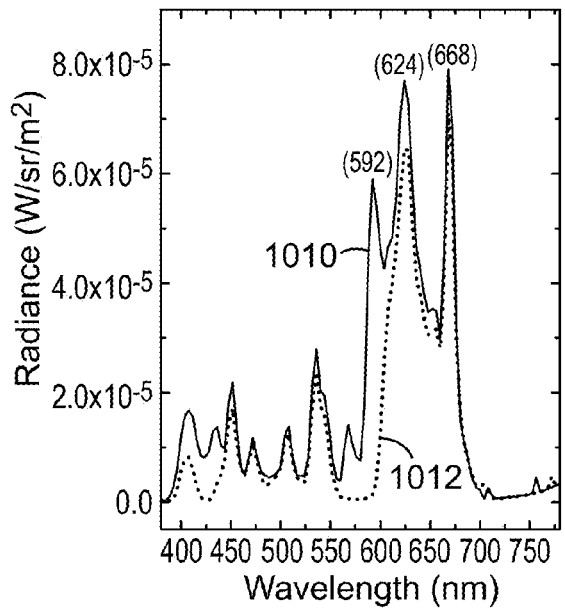
FIGS. 10a-c are graphs of the spectral intensity or radiance of a metal halide lamp as reflected from the red, green, and blue subpixels of a Cholesteric liquid crystal display (ChLCD) panel, and as filtered by the filter of FIG. 9.
Figure 10B:
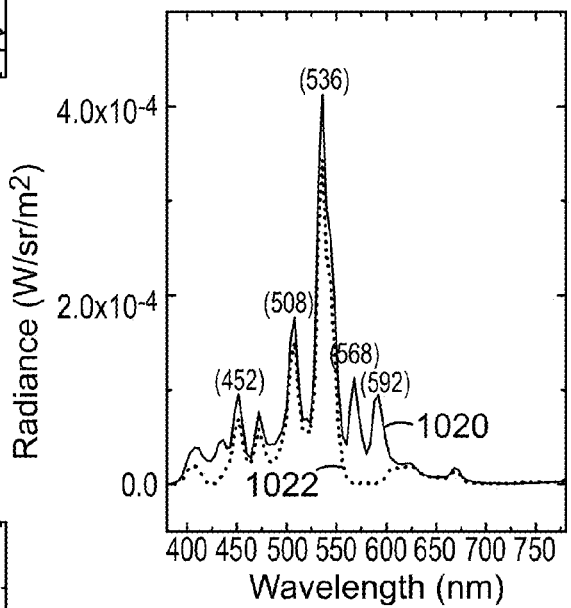
Figure 10C:
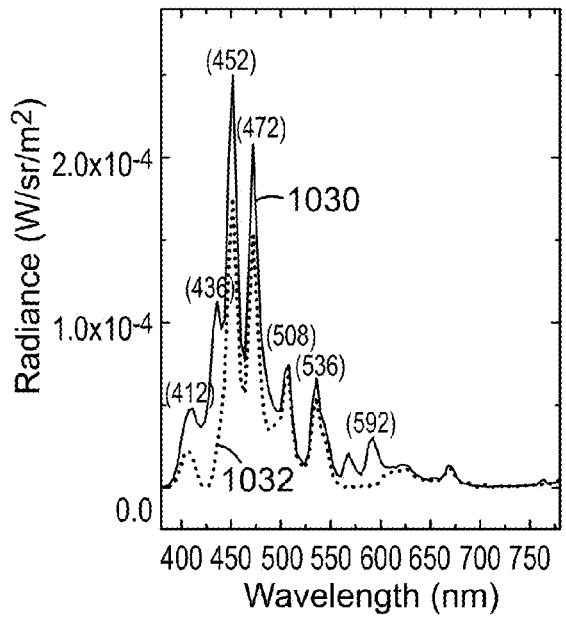

The filter of curve 910 blocks the unwanted spectral lines from about 570 to 590 nm, and has a relatively high transmission in other regions of the spectrum. Source light that results from using this filter to filter the lamp light of curve 912, when reflected from the RGB ChLC panel described above (alternately controlled to reflect red, green, and blue light by separately activating the red, green, and blue ChLC subpixels), yields a radiance or intensity of reflected light for the red, green, and blue reflective states of the panel shown in FIGS. 10a, 10b, and 10c respectively. Thus, in FIG. 10a, curve 1010 shows the reflected intensity or radiance from the red-activated RGB ChLC panel without the curve 910 interference filter, and curve 1012 shows the reflected intensity with the interference filter. In FIG. 10b, curve 1020 shows the reflected intensity or radiance from the green-activated RGB ChLC panel without the curve 910 interference filter, and curve 1022 shows the reflected intensity with the interference filter. In FIG. 10c, curve 1030 shows the reflected intensity or radiance from the blue-activated RGB ChLC panel without the curve 910 interference filter, and curve 1032 shows the reflected intensity with the interference filter.

Figure 11:
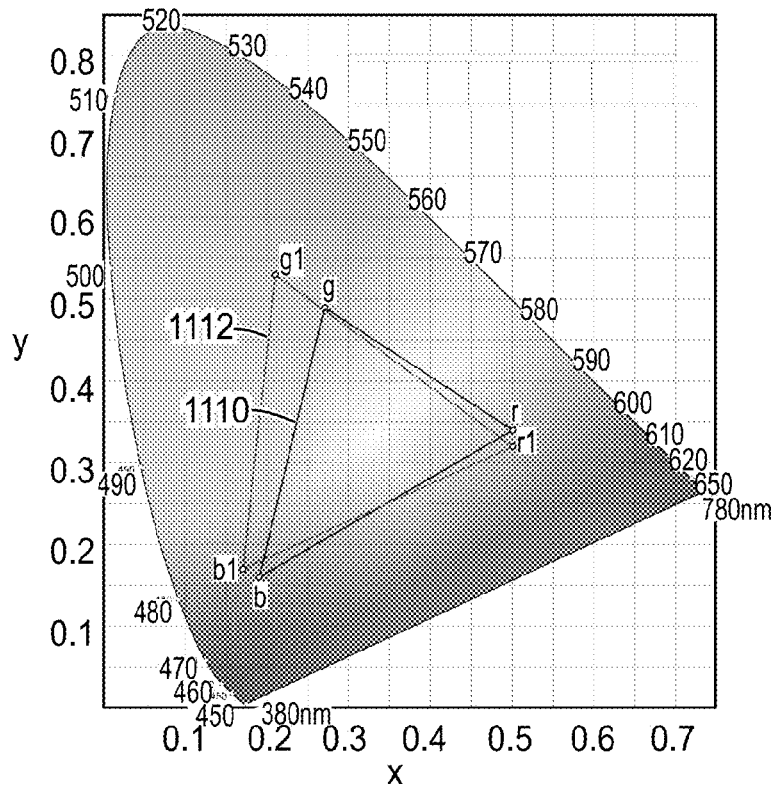
FIG. 11 is a CIE chromaticity diagram showing the improvement to color gamut that can be achieved with the filter of FIG. 9.

The filter of curve 910 can thus be seen to substantially eliminate the unwanted emission lines at about 570 and 590 nm. The elimination of these lines also has a beneficial effect on the color gamut of the system. FIG. 11 is a CIE chromaticity diagram showing the color gamut 1110 of a (baseline) display system that uses a metal halide lamp and the RGB ChLC panel as a reflective display, which color gamut is similar to color gamut 810 of FIG. 8. When a filter having the transmission of curve 910 is added to the baseline system, the result is color gamut 1112, which is substantially larger and thus enhanced relative to gamut 1110. In fact, the area of color gamut 1112 is about 30% larger than the area of color gamut 1110. In comparing the gamuts 1110, 1112, one can see that the green subpixel (represented by the uppermost corner of each triangle) exhibits the largest improvement in color saturation with the addition of the blocking filter.

Figure 12A:
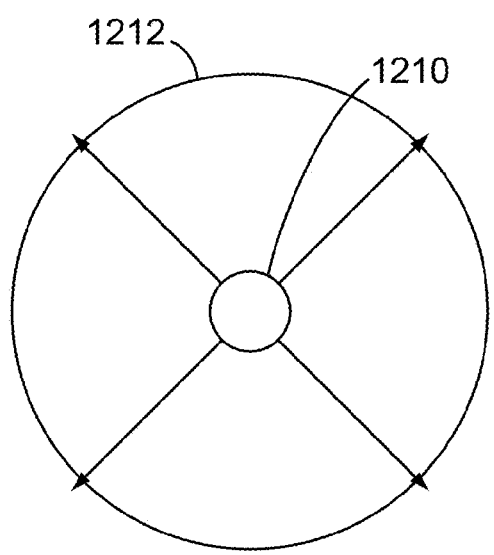
FIG. 12a is a schematic side or sectional view of a portion of a light source that includes a lamp and a filter assembly.
Figure 12B:
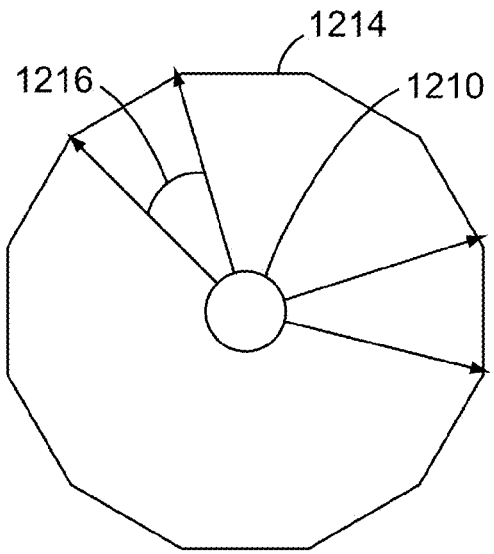

The spectral characteristics of interference filters are known to change as a function of incidence angle. For example, reflection bands (and transmission bands) tend to shift to shorter wavelengths as the incidence angle changes from normal incidence to more oblique angles. Thus, for example, the filter represented by the normal incidence transmission curve 910 of FIG. 9 will effectively block the 570 and 590 nm metal halide emission lines for incidence angles of less than 15 degrees, but for larger incidence angles blocking of these lines (particularly the 590 nm line) will be weaker and may eventually become unacceptable. In order to promote strong blocking of the undesirable emission lines by the interference filter, the light source may include a filter assembly that at least partially surrounds the metal halide lamp in such a way as to limit the amount of light striking the interference filter at unacceptably oblique angles. The filter assembly may be composed of a transparent, rigid (or at least self-supporting) material to which the interference filter can be bonded, applied, or otherwise attached or coupled. Alternatively, the interference filter itself, if it is self-supporting, may form the filter assembly. The geometry of the filter assembly may be such that light from the lamp that passes through the filter assembly impinges upon the filter assembly at normal or near-normal incidence angles, e.g., angles less than about 15 degrees. A filter that is applied to such a filter assembly may thus be more effective at blocking undesirable emission lines from the lamp. Light sources that include suitable filter assemblies such as this are shown in schematic side or sectional view in FIGS. 12a and 12b. In each of those figures, a lamp 1210 is shown centrally located or mounted. Around this lamp, which may be a metal halide lamp or other suitable broadband lamp, a suitably shaped filter assembly can be provided. In FIG. 12a, a spherically-shaped filter assembly 1212 is used; in FIG. 12b, a near-spherical faceted filter assembly 1214 is used. In each figure, arrows are used to show representative light rays emanating from the lamp 1210. In FIG. 12b, the angle 1216 subtended by one of the facets may characterize an acceptance angle of the interference filter.

For the spherical geometry (globe) of FIG. 12a, the light rays originating from the lamp are all at substantially normal incidence to the filter assembly, and the interference filter (which may be attached to an inner or outer surface of the filter assembly) can effectively block the unwanted emission lines. In the faceted geometry of FIG. 12b, the light rays are substantially all within a predetermined acceptance angle of the interference filter. In the faceted construction, smaller flat sections of filters may be mounted on a frame (e.g. a soccer ball-like construction) around the light source to form the filter assembly. FIGS. 12a and 12b show the filter assemblies completely surrounding the lamp 1210, but in alternative embodiments the filter assemblies may only partially surround the lamp, e.g., as in the case of a hemisphere or other partial sphere.

Figure 13:
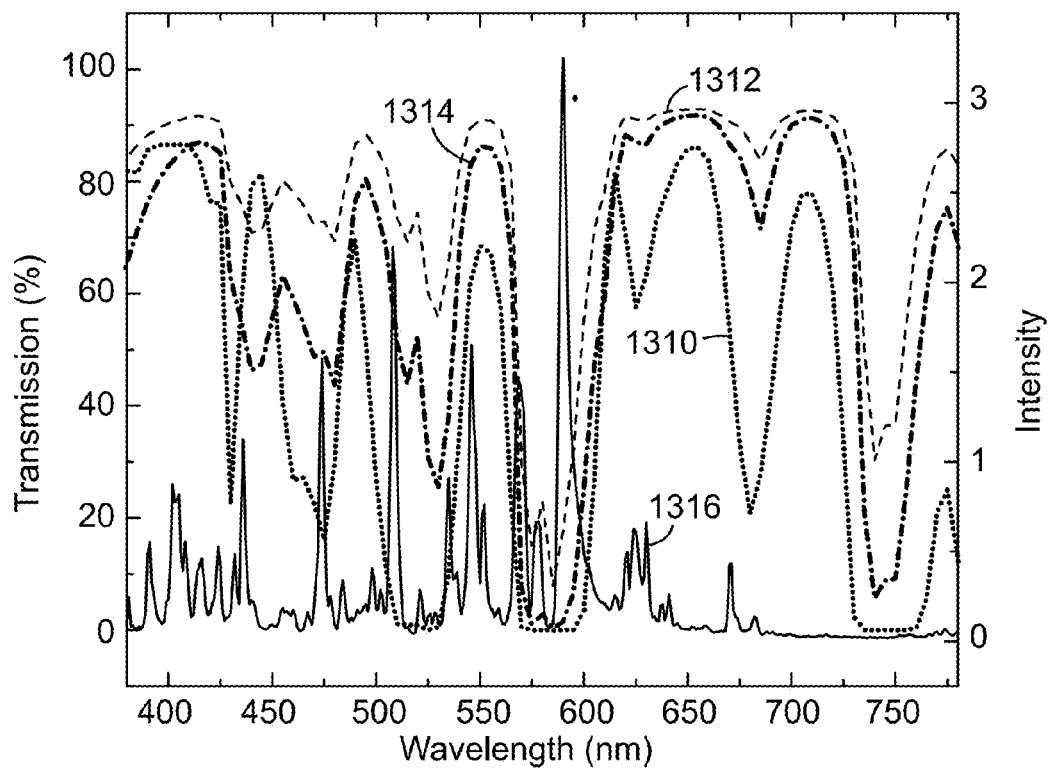
FIG. 13 is a combination graph of the spectral intensity of a typical metal halide lamp, and the spectral transmissivity of exemplary absorptive filters that may be used in the light source.

Instead of, or in addition to, an interference filter, one or more absorptive filters may also be used to selectively block unwanted emission lines. The filtering properties of absorptive filters are much less sensitive to changes in incidence angle of the light, compared to interference filters. FIG. 13 is a combination graph of the spectral transmissivity of exemplary absorptive filters that may be used in the light source, on which is superimposed the spectral intensity of a typical metal halide lamp. Curves 1310, 1312, 1314 represent the spectral transmissivity (percent transmission as a function of wavelength) of various absorptive filters, and are drawn to scale according to the percent transmission scale on the left-hand side of the figure. Curve 1316 represents the spectral output of a conventional metal halide lamp, which is drawn to scale according to the intensity scale (in arbitrary units) on the right-hand side of the figure.

The absorptive filters depicted in FIG. 13 are each in the form of a plate or layer of glass that has been doped with rare earth materials, namely, neodymium and praseodymium. These filters selectively absorb light from about 570 to 590 nm. The degree of absorption can be tailored by controlling the thickness of the filter, the doping level of the rare earth material, or both. For example, the filter of curve 1310 (Hoya Corporation, type V-30) had a 2.5 mm thickness, the filter of curve 1312 (Hoya Corporation, type V-10) had a 1.0 mm thickness, and the filter of curve 1314 (Hoya Corporation, type V-10) had a 2.5 mm thickness. By proper adjustment of the absorptive filter thickness and doping level, the absorption can be made to provide sufficient blocking of the unwanted emission lines while maintaining acceptable transmission in other regions of the spectrum.

Figure 14A:
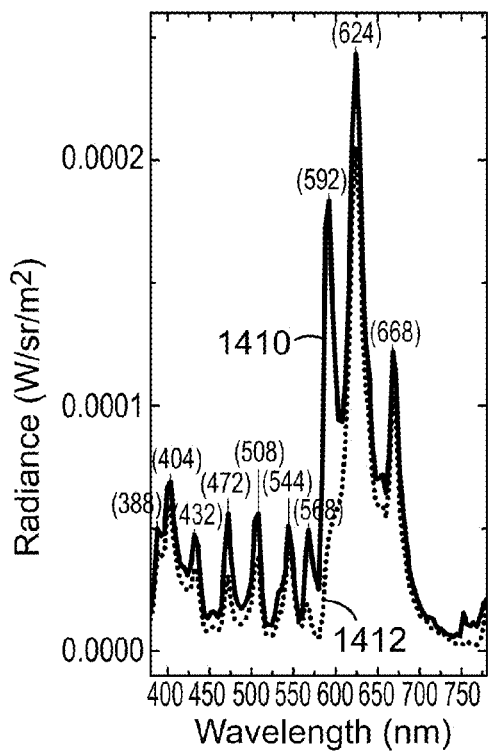
FIGS. 14a-c are graphs of the spectral intensity or radiance of a metal halide lamp as reflected from the red, green, and blue subpixels of a Cholesteric liquid crystal display (ChLCD) panel, and as filtered by one of the filters of FIG. 13.
Figure 14B:
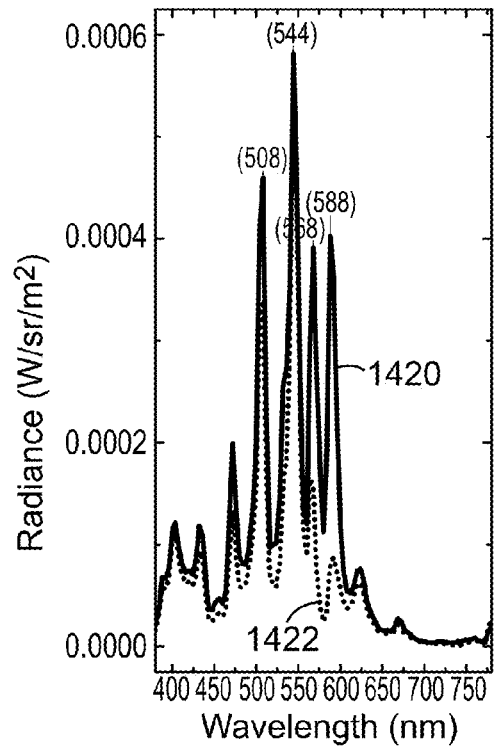
Figure 14C:
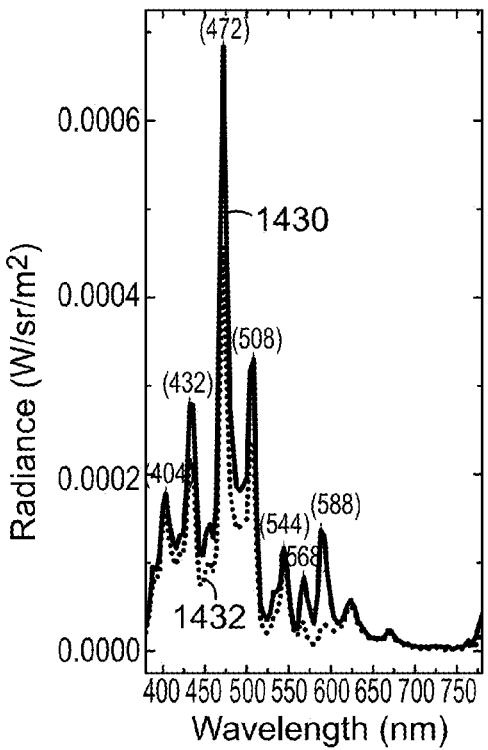

The effect of adding the absorptive filter of curve 1312 to a light source that also includes a metal halide lamp, in a display system utilizing the above-described RGB ChLC panel, is shown in FIGS. 14a-c. In FIG. 14a, curve 1410 shows the reflected intensity or radiance from the red-activated RGB ChLC panel without the absorptive filter, and curve 1412 shows the reflected intensity with the absorptive filter. In FIG. 14b, curve 1420 shows the reflected intensity or radiance from the green-activated RGB ChLC panel without the absorptive filter, and curve 1422 shows the reflected intensity with the absorptive filter. In FIG. 14c, curve 1430 shows the reflected intensity or radiance from the blue-activated ChLC panel without the absorptive filter, and curve 1432 shows the reflected intensity with the absorptive filter. As seen from the figures, the absorptive filter largely eliminates the unwanted 570 and 590 nm emission lines while maintaining high transmission in the desired regions of the spectrum. This results in a significant improvement in the color gamut as seen in FIG. 15.

Figure 15:
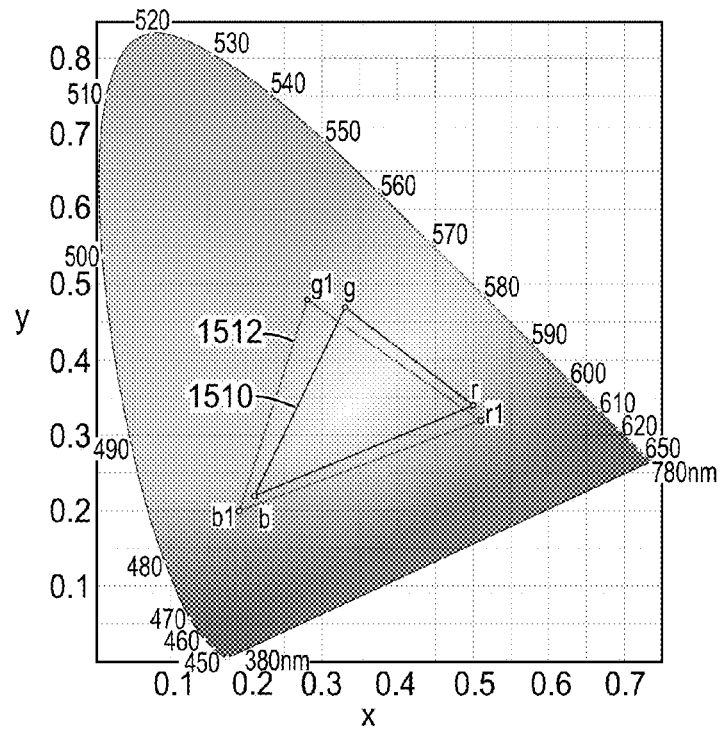
FIG. 15 is a CIE chromaticity diagram showing the improvement to color gamut that can be achieved with the same filter used in FIGS. 14a-c.

FIG. 15 is a CIE chromaticity diagram showing the improvement to color gamut that can be achieved using a light source that combines a metal halide lamp with the absorptive filter used in FIGS. 14a-c. Curve 1510 represents the color gamut of a (baseline) display system that uses a metal halide lamp and the RGB ChLC panel, which color gamut is similar to color gamut 1110 of FIG. 11 and color gamut 810 of FIG. 8. When an absorptive filter having the transmission of curve 1312 is added to the baseline system, the result is color gamut 1512, which is substantially larger and thus enhanced relative to gamut 1510. In fact, the area of color gamut 1512 is more than 30% larger than the area of color gamut 1510.

While the degree of blocking provided by absorptive filters may in some cases not be as high as that provided by interference filters, absorptive filters can offer significant advantages. Due to reliance on absorption, absorptive filters exhibit little to no angular dependence, in comparison to interference filters. Absorptive filters are also relatively inexpensive compared to multilayer interference based filters.

Whether one or more interference filter, one or more absorptive filter, or both, are used in the light source, the filter(s) may be disposed at any one or more of a variety of locations in the light source fixture. Interference filters, due to their angular dependence, may preferably be applied to a lamp housing such as lamp housing 314 of FIG. 3. The filter assemblies discussed in connection with FIGS. 12a and 12b, or modified versions thereof, may also be used as a type of lamp housing 314 (see FIG. 3), and/or as a type of filter plate 318 (see FIG. 3), and/or as a type of lenslet cover 320 (see FIG. 3). Absorptive filters may be incorporated in the lamp housing and/or as a filter plate and/or mounted on a reflector such as reflector 316 (see FIG. 3). In some cases a front lenslet structure, used to focus the lamp onto the display, may be formed from the absorptive filter material. Absorptive and/or interference filters may also be incorporated in the light source in a reflector such as reflector 316 (see FIG. 3).

Having discussed the subtractive or filtering technique for overcoming the deficiencies of metal halide sources, we now turn to the additive or supplemental light source technique.

One shortcoming of metal halide sources, and potentially other broadband emitting lamps, is the lack of sufficient intensity in the red region of the spectrum (see e.g. FIG. 6). We have found that this shortcoming can be overcome by supplementing the lamp with at least one secondary or supplemental source that has higher brightness in the red.

One promising class of sources that can be used for this purpose is visible LED sources. A visible "light emitting diode" or "LED" in this regard may refer to a diode that emits visible light. It includes incoherent encased or encapsulated semiconductor devices marketed as "LEDs", whether of the conventional or super radiant variety, and whether of the forward-emitting or side-emitting variety. The LED may initially emit non-visible light such as ultraviolet light, but it may be packaged to include an organic or inorganic phosphor (or it may illuminate a remotely disposed phosphor) to convert short wavelength light to longer wavelength visible light. An "LED die" is an LED in its most basic form, i.e., in the form of an individual component or chip made by semiconductor processing procedures. For example, the LED die is typically formed from a combination of one or more Group III elements and one or more Group V elements (III-V semiconductor). The LED die may be configured for surface mount, chip-on-board, or other known mounting configurations.

Figure 16:
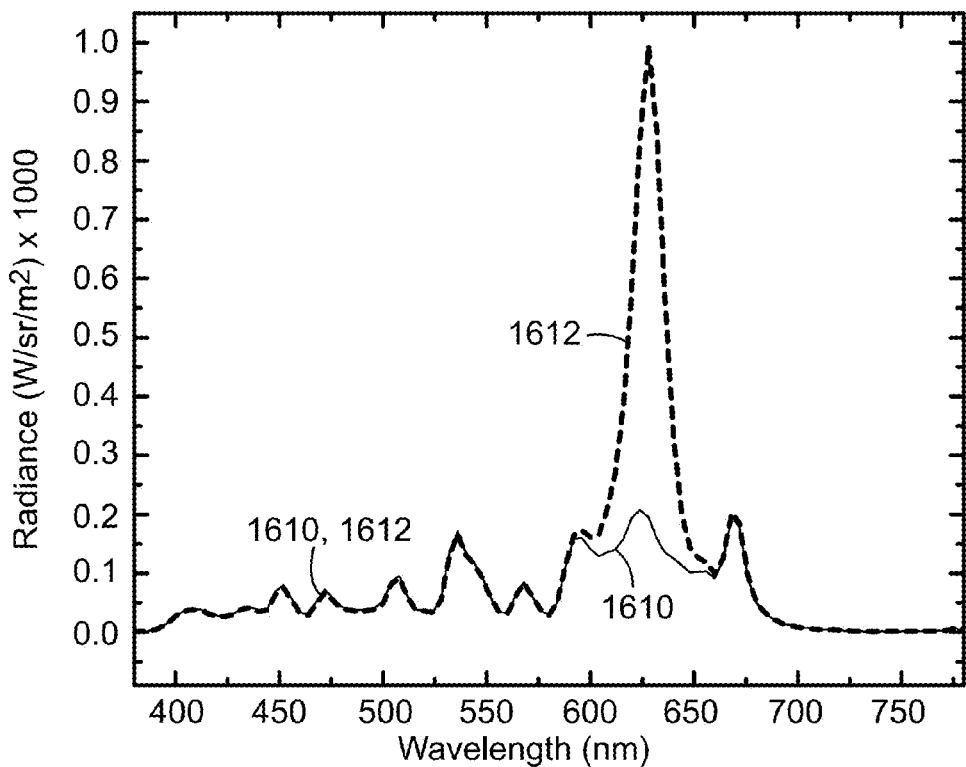
FIG. 16 is a graph of the spectral intensity or radiance of a metal halide lamp as reflected from a red subpixel of a Cholesteric liquid crystal display (ChLCD) panel, and where the metal halide lamp is supplemented with light from a red LED.

Thus, in at least some embodiments, we propose modifying the light source so that it includes both a broadband emitting lamp such as a metal halide lamp, as well as one or more red light emitting LEDs that are suitably mounted in the light source fixture so that both lamp light and red LED light illuminate the front of the reflective display panel. The reflected intensity or radiance of the red-activated RGB ChLC panel under illumination by a metal halide lamp only, and by a metal halide lamp in combination with a supplemental red LED (Philips/Color Kinetics, ColorReach), is shown in curves 1610 and 1612, respectively, of FIG. 16. The supplemental red LED results in an almost 5-times increase in the peak brightness of the red reflection peak. Furthermore, due to the relatively narrow emission peak of the red LED, the color saturation of the ChLC red subpixel is also improved compared to metal-halide-only illumination. In such a hybrid system (i.e., a system including both the broadband lamp and the supplemental light source), the bulk of the illumination (lumens) may still be provided by the broadband lamp. Consequently, the brightness, weight, and cost advantages of such lamps may still be substantially maintained.

The hybrid system or so-called additive technique can be combined with subtractive technique discussed above in connection with the filters. The filters may thus be used to block unwanted emission lines in the broadband lamp light, and the supplemental light source (such as one or more red LEDs) may be used to supplement the lamp in the selected region(s) of the spectrum. In some embodiments, a filter that transmits only the blue and green lamp emission lines may be used with one or more red LEDs that would then provide substantially all of the illumination in the red. Such a filter may be easier to fabricate than one designed to selectively block only certain spectral lines, and to substantially transmit light on both sides (longer wavelengths and shorter wavelengths) of such lines. The simpler interference filter design could have a wider acceptance angle than one with a narrow blocking region. For a wider acceptance angle, the filter assembly shown in FIG. 12b may be more easily constructed with a fewer number of facets. The transmission spectrum of one such interference filter is shown in FIG. 17.

Figure 17:
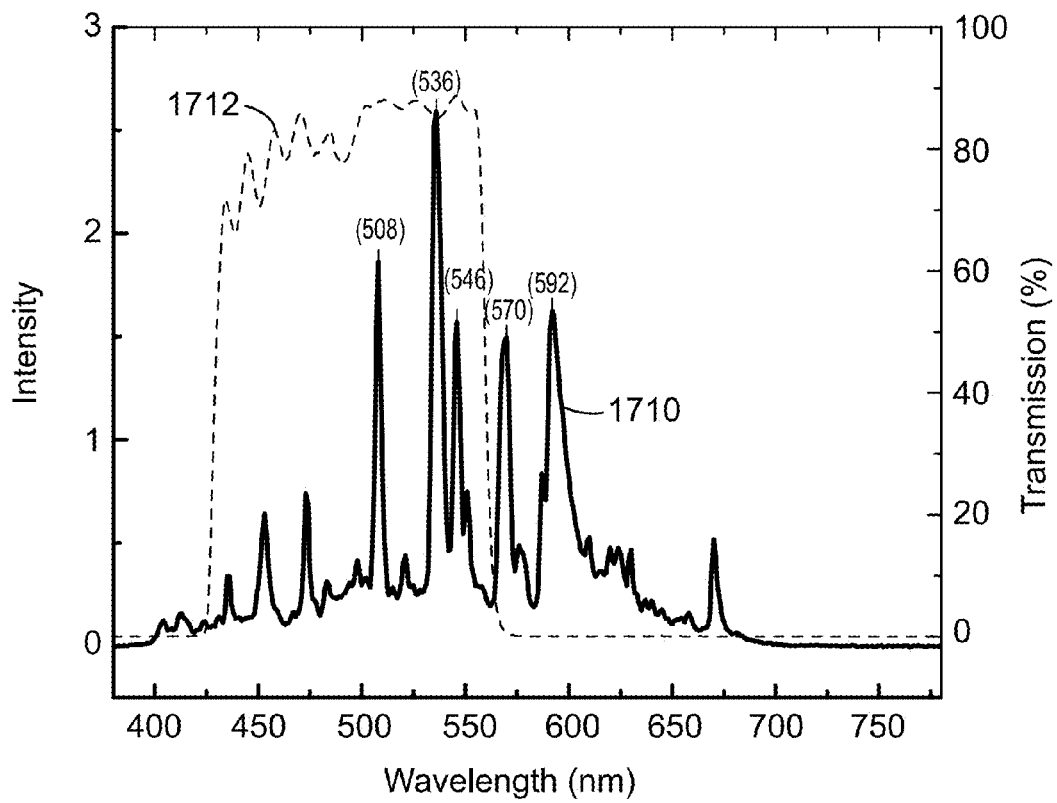
FIG. 17 is a combination graph of the spectral intensity of a typical metal halide lamp, and the spectral transmissivity of a filter that may be suitable for use in a system that incorporates red LED supplemental light sources.

Thus, FIG. 17 is a combination graph of the spectral intensity 1710 of a typical metal halide lamp, and the spectral transmissivity 1712 of an interference filter that may be suitable for use in a system that incorporates red LED supplemental light sources. The spectral intensity 1710 is drawn to scale according to the intensity scale (in arbitrary units) on the left-hand side of the figure; the spectral transmissivity 1712 is drawn to scale according to the percent transmission scale on the right-hand side of the figure. The interference filter has high transmission from about 425 to 575 nm, and effectively blocks all other wavelengths.

Figure 18A:
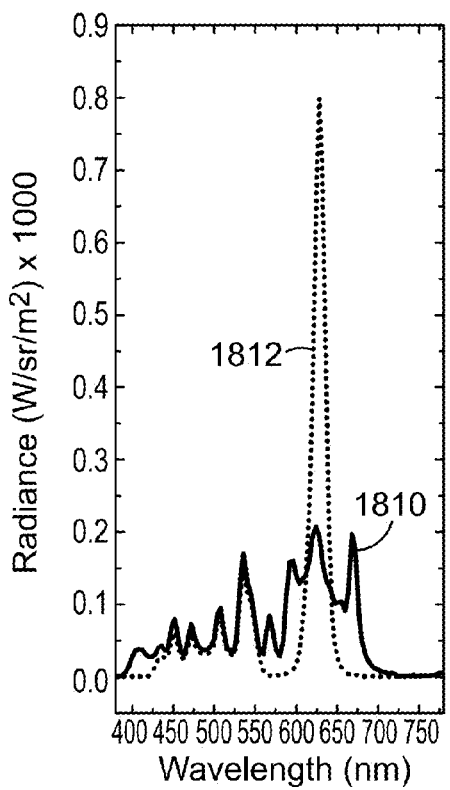
FIGS. 18a-c are graphs of the spectral intensity or radiance of a metal halide lamp that has been filtered with the filter of FIG. 17 and supplemented with red LED light, as reflected from the red, green, and blue subpixels of a Cholesteric liquid crystal display (ChLCD) panel.
Figure 18B:
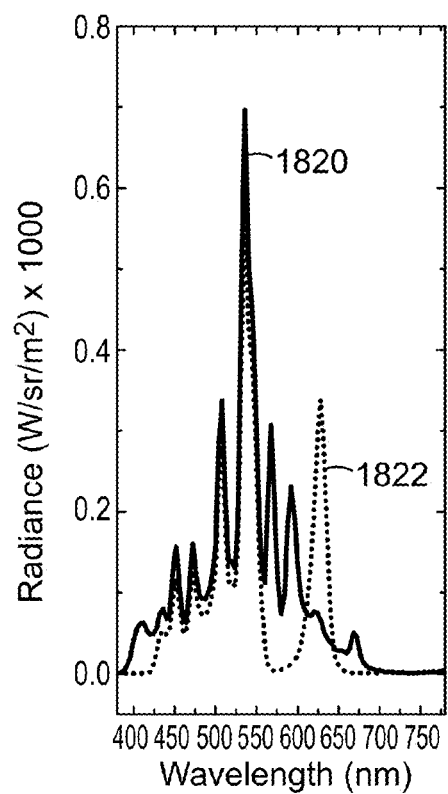
Figure 18C:
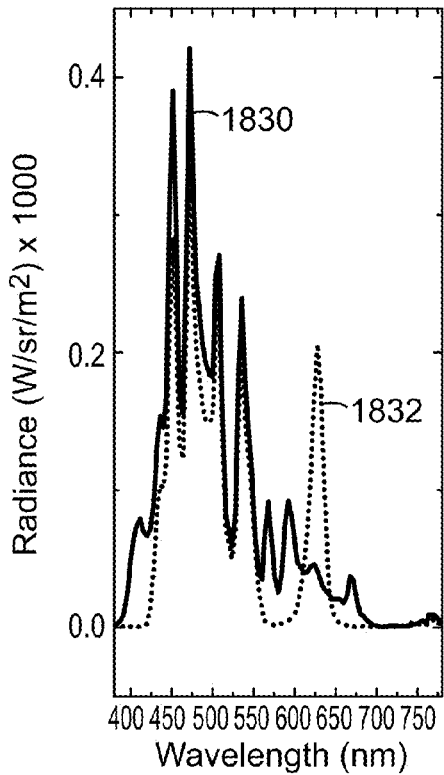

When this interference filter is used in a light source that also includes a metal halide lamp and supplemental red LEDs, the radiance or intensity of the light reflected by the RGB ChLC panel (when separately controlled to reflect red, green, and blue light by the red, green, and blue ChLC sub-pixels) is shown by curves 1812, 1822, and 1832 in FIGS. 18a, 18b, 18c respectively. Note that these curves were obtained with the interference filter positioned to filter the metal halide lamp, but not the red LEDs. In these same figures, curves 1810, 1820, and 1830 depict the reflected radiance of the same reflective display system except where the interference filter and the supplemental LEDs were removed from the light source (i.e., the light source consisted essentially of the metal halide lamp).

The reflected red, green, and blue light from the system of FIGS. 18a-c is able to achieve a system color gamut whose area is more than 40% greater than the area of a comparable baseline system.

We have shown that subtractive techniques and/or additive techniques can be used to enhance the performance of reflective display systems. In cases where a ChLC display panel is used as the reflective display, we believe that even better performance than that reported above may be obtained by including both a yellow-transmitting filter (see layer 416, FIG. 4) and a red-transmitting filter (see layer 420, FIG. 4) in the ChLC display panel.

The reader will keep in mind that numerous variations can be made with respect to the measurement devices, systems, and methods disclosed herein, and all such variations are considered to be encompassed by this disclosure. For example, the techniques disclosed herein may be practiced on reflective displays that have any desired combination of sub-pixel colors, and are not limited to displays having the primary subpixel colors of red, green, and blue. Other numbers of subpixels, and other subpixel colors, may instead be used.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A display system, comprising:
   a display panel having a front surface and a back surface, the display panel further including electronically addressable reflective pixels, each pixel comprising a first, second, and third subpixel of different first, second, and third colors, respectively; and
   a light source configured to illuminate the front surface of the display panel with source light, such that the source light is selectively reflected by the pixels to provide a color image to an observer disposed in front of the display panel;
   wherein the light source comprises a first lamp that emits a first lamp light, the first lamp light including light components of the first, second, and third colors;
   wherein a combination of the first lamp light and the display panel provide a first color gamut;
   wherein a combination of the source light and the display panel provide a second color gamut;
   wherein the light source includes a first enhancing element such that the second color gamut has an area greater than that of the first color gamut;
   wherein the first enhancing element comprises a first filter disposed to filter the first lamp light; and
   wherein the light source comprises a filter assembly at least partially surrounding the first lamp, and the first filter is disposed on the filter assembly.

2. The system of claim 1, wherein the filter assembly has a faceted construction that limits an angle of incidence to within an acceptance angle of the first filter.

3. The system of claim 1, wherein the filter assembly has a curved construction that limits an angle of incidence to within an acceptance angle of the first filter.

* * * * *